(12) United States Patent
Wayer

(10) Patent No.: US 6,276,515 B1
(45) Date of Patent: Aug. 21, 2001

(54) STEADY-FLOW CONVEYOR

(76) Inventor: Harald M. Wayer, Heidelbergorstrasse 61, 69168 Wiesloch (DE)

( * ) Notice: Subject to any disclaimer, the term of this patent is extended or adjusted under 35 U.S.C. 154(b) by 0 days.

(21) Appl. No.: 09/375,336

(22) Filed: Aug. 16, 1999

Related U.S. Application Data

(60) Provisional application No. 60/129,494, filed on Apr. 15, 1999.

(30) Foreign Application Priority Data

Aug. 17, 1998 (DE) .............................. 198 36 951

(51) Int. Cl.⁷ ................................... B65G 43/00
(52) U.S. Cl. ........................................ 198/502.1
(58) Field of Search .................... 198/502.1; 40/524, 40/526, 525, 532, 472

(56) References Cited

U.S. PATENT DOCUMENTS

| | | | |
|---|---|---|---|
| 4,496,141 | 1/1985 | Nayate | 270/55 |
| 5,280,831 * | 1/1994 | Conklin, Jr. | 198/502.1 |
| 5,330,044 | 7/1994 | Conklin, Jr. | 198/502.1 |
| 5,427,227 | 6/1995 | Crandall et al. | 198/502.1 |
| 6,044,961 * | 4/2000 | Hine | 198/502.1 |

FOREIGN PATENT DOCUMENTS 9824713    6/1998   (WO) .

* cited by examiner

Primary Examiner—James R. Bidwell
(74) Attorney, Agent, or Firm—Davidson, Davidson & Kappel, LLC

(57) ABSTRACT

A steady-flow conveyor for transporting objects and or persons is provided which includes a load carrier which, at one or several of its longitudinal sections, that is, at one or several successive points in longitudinal direction, is provided with at least one holding device to which at least one advertising medium is attached.

20 Claims, 5 Drawing Sheets

STEADY-FLOW CONVEYOR

REFERENCE TO RELATED APPLICATION

This application claims priority from U.S. Provisional Application Serial No. 60/129,494, filed Apr. 15, 1999, and entitled "Steady-flow Conveyor, in Particular Luggage Conveyor", the entire disclosure of which is hereby incorporated by reference.

FIELD OF THE INVENTION

The invention relates to a steady-flow conveyor, in particular, a luggage conveying belt comprising a continuous load carrier unit for the transport of objects and/or persons especially for use inside buildings or a locations which, for example, like luggage carrousels at airports, are accessible to limited or unlimited varying groups of persons.

BACKGROUND INFORMATION

Such steady-flow conveyors, that is, conveyor systems equipped with a load carrier designed to enable the continuous conveyance of materials (object and/or persons) on a given transport route from the checking-in point to the delivery point and, in numerous cases also back again (circular conveyor route) and, in particular, the luggage carrousels/luggage conveyor systems at the withdrawal departments of airports, are being watched every day by a multitude of people—while persons are waiting for very particular goods to be delivered—e.g. their personal items of luggage—which are forwarded to them by means of the particular conveyor belt/conveyor system.

This time of waiting and watching usually is passing by without any special benefit for anybody and, in general, is experienced as utterly boring by the persons concerned.

On the other hand, it is always a problem on the advertising sector to find hoarding, objects and times for advertising which will arouse or, respectively catch, the interest and the attention of as large and as widely spread a group of persons as possible.

SUMMARY OF THE INVENTION

The above-referenced problems are solved by the invention in question, namely, a steady-flow conveyor of the above-described type which distinguishes itself in that it works with a load carrier which, at one or several of its longitudinal sections, that is, at one or several successive points in longitudinal direction, is provided with at least one holding device to which at least one advertising medium is attached.

All the people who are watching the conveying belt while they are waiting for the arrival of an object necessarily look at the advertising media which are continuously passing by during their waiting time and, according to the general experience of life, they will at least unconsciously take note of the advertising message conveyed by these advertising media.

Thus, the steady-flow conveyor which constitutes the object of the invention provides an advertising medium which above all distinguishes itself in that it is located within the visual field of the groups of market participants addressed and which is being observed with attention practically all the time.

In accordance with a preferred embodiment of the present invention, the steady-flow conveyor comprises a load carrier including a belt, a band or a plate. This type of steady-flow conveyor is widely used, above all on the sector of luggage conveyance—e.g. as conveyor table or as round-and-round walking or conveying track with any number of turns, upward and downward movements. In accordance with this embodiment of the present invention, holding device(s), which accommodate the advertising media, can be attached to the belt, band or, most preferably, to the plate of the conveyor. The advertising media extends over or above the surface plane of the load carrier. Moreover, this may even be implemented during the course of retrofitting already existing (installed) conveyors. Particularly in the case of steel-plate conveyors, a retrofit is technically feasible without any problems in that individual common-type plates or lamellas are replaced by plates or lamellas, respectively, which are provided with a holding device according to the invention.

The holding device(s) is (are) preferably (ideally) positioned at the top side or, respectively, at the surface of the load carrier and, therefore, will prejudice neither the drive nor the forward or backward movement of the load carrier, nor will it (they) cause problems while passing a possible hollow way or tunnel course (e.g. between closely adjacent limiting walls or through the radiological department).

In a preferential variant of construction the holding device (s) is (are) situated in the lateral area, that is, along one or both longitudinal edge(s) of the load carrier. This has the advantage that at least the central area continues to be available for the transport of goods and/or persons throughout this longitudinal sector.

The holding device(s) preferably comprises(comprise) locking and/or anchoring facilities to which the advertising medium can be attached with free motion at a plane parallel to the conveying plane and/or in perpendicular and/or diagonal direction towards it, that is, at an angle to the conveying plane. The locking or anchoring with free motion at a plane parallel to the conveying plane, for example, by means of ball-and-socket or walk-along joint(s) ensures that the respective advertising medium is rotatable in or, respectively, parallel to the conveying plane and, therefore, can also easily follow the transverse movements of the load carrier, irrespective of its dimensions, in the direction of the longitudinal axis of the load carrier. The—preferably additional—use of locking and/or anchoring facilities with free perpendicular and/or diagonal (at an angle) motion towards the conveying level, for example, in the form of spring (element) joints, creates the respective prerequisites so that the advertising medium can also follow an upward and downward course of the conveying track.

The spring (element) joints can—if necessary also in combination with additional (single) pressure springs (in particular, helical springs)—also be arranged at one or several planes in such a way that they form a buffer or crusher zone at the respective plane(s). This buffer or crusher zone protects the holding device, the advertising media attached to it or contained therein and also the plate(s)/lamella(s) carrying the holding device from bumps and percussive impacts that may occur e.g. when luggage is thrown onto the steady-flow conveyor.

The holding devices should be equipped with safety appliances against unintentional and/or unauthorized opening or detachment.

As advertising media both advertising boards and, in particular, also real shape models (that is, the "real", "true" standard shape) or mock-ups of a suitcase, of a traveling bag, a knapsack or any other common or uncommon item of luggage, may be taken into consideration.

Even the advertised object itself may, however, be used as advertising medium provided that it can be transported on the respective conveyor or conveying system.

BRIEF DESCRIPTION OF THE DRAWINGS

In the following the invention will be explained more in detail based on the embodiments displayed on the attached illustrations, such as.

DETAILED DESCRIPTION OF THE PREFERRED EMBODIMENTS

Figure 1:
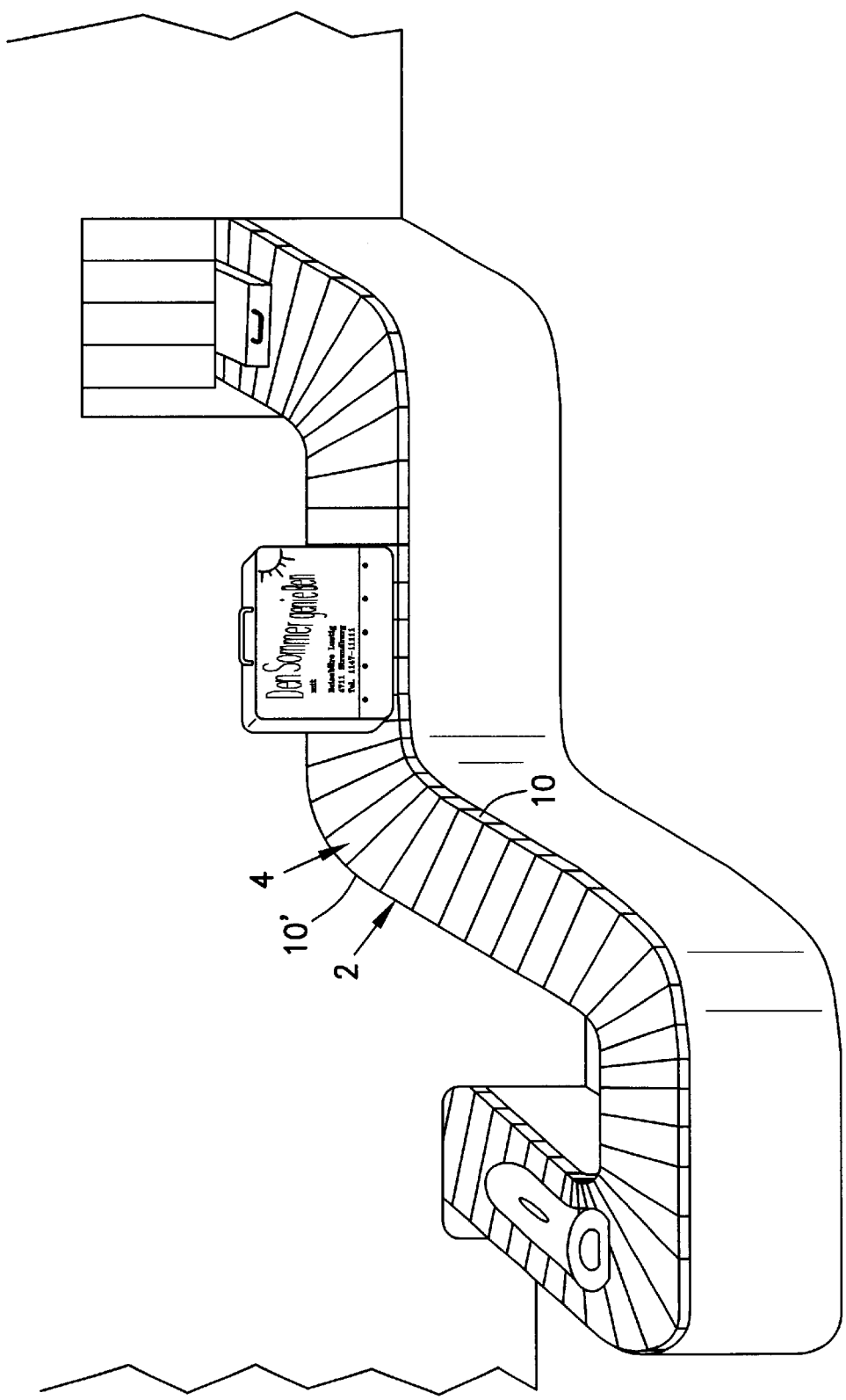
FIG. 1 is an exploded view of a plate conveyor which constitutes the object of the invention, with holding device and advertising medium.
Figure 2:
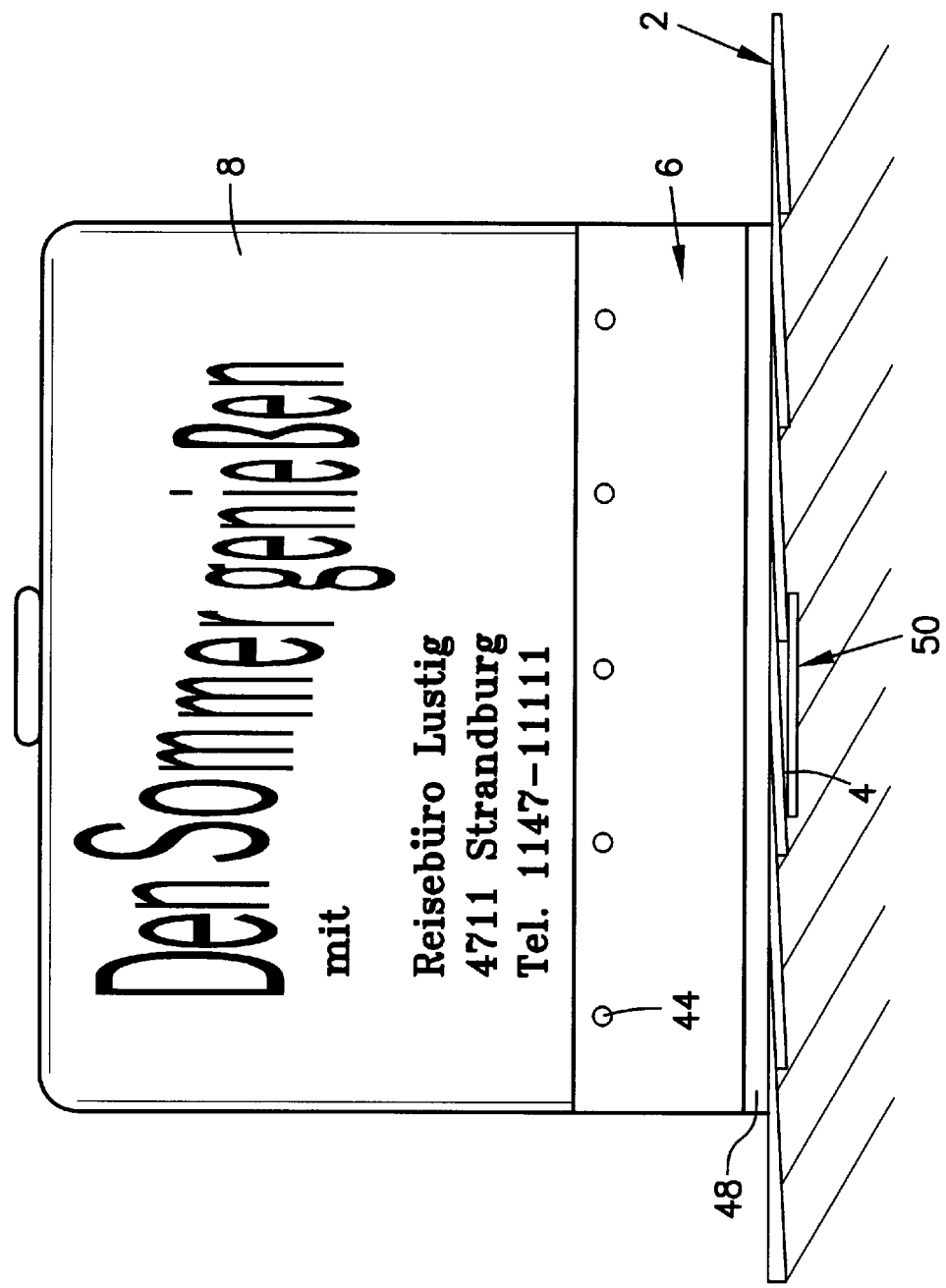
FIG. 2 shows a detailed rendition of the holding device with advertising medium pursuant to FIG. 1, wherein the German text reads "Enjoy the Summer with Travel Agency Fun 4711 Beach Castle, Tel. 1147-1111"

FIG. 1 displays a typical luggage conveyor of the type which is generally known mainly from luggage delivery points at airports. The luggage conveyor system is provided with load carriers a so-called plate band (2) comprised of uniform rectangular flat plates (4) or lamellas, respectively, arranged in consecutive order along the longitudinal direction of the band with their longitudinal sides (10, 10') running transversely to the longitudinal direction of the band. The section of the plate band (s) presented here—an enlargement of which is shown in FIG. 2—is provided with a holding device (6) for an advertising medium (8) arranged along the longitudinal exterior side (10) of the plate band (2), that is, on the side which is facing the observer (as contrasted with the longitudinal interior side (10')). The advertising medium (8) used in this example is the original form of a suitcase carrying an advertising slogan on its upper side.

Figure 3:
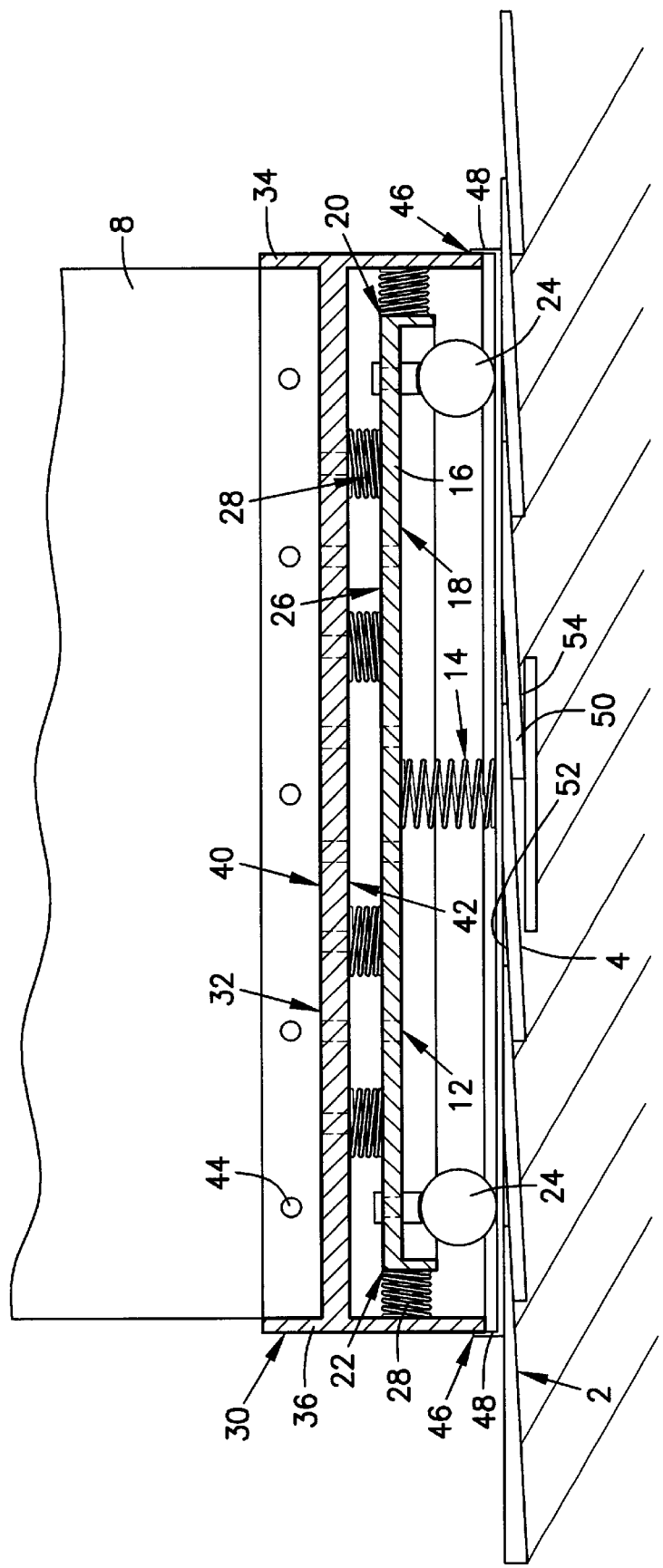
FIG. 3 is a section through holding device pursuant to FIG. 2 at the focal plane, and pursuant to FIG. 4, from III to II (perpendicular to the focal plane)
Figure 4:
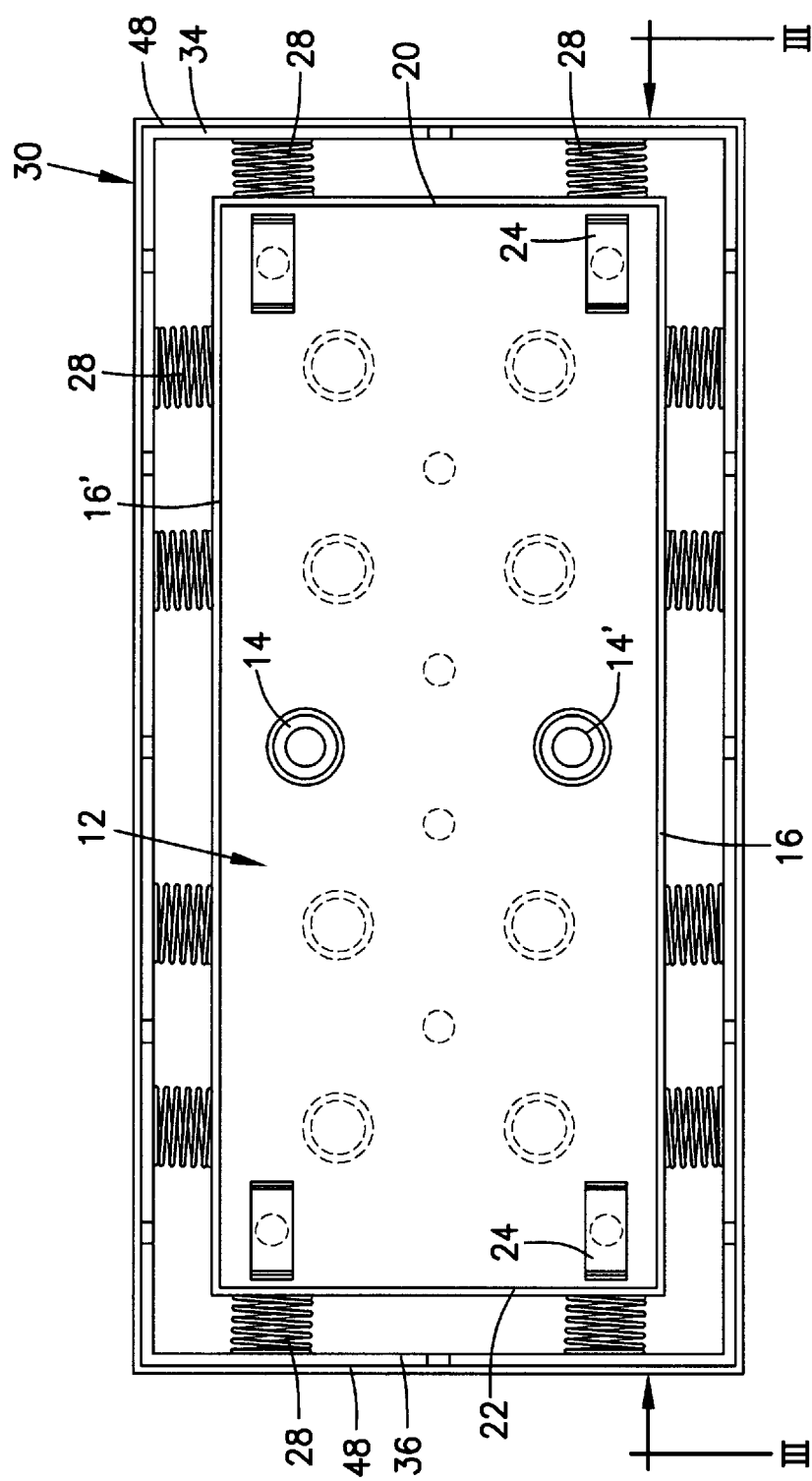
FIG. 4 is a view of a holding device pursuant to FIG. 1 and FIG. 2 depicted from underneath.

In the FIGS. 3 and 4, the design of the holding device (6) of this embodiment is shown more in detail. The holding device (6) includes a base plate (12) of rectangular layout which is anchored to a plate/lamella (4) of the plate band (2) by means of two spring joint elements (14,14'). The base plate (12) is oriented in such a way that its longitudinal sides (16,16') run transversely to the longitudinal sides (10,10') of the plates/lamellas (4) of the plate band (2) (cf. FIG. 1).

On the one side, the two spring joint elements (14, 14') are fastened to the bottom side (18) of the base plate (12) almost in dead center, that is, approximately at the level of the longitudinal median line, in practically mirror—inverted arrangement facing each other in a way which is not described more in detail. On the other side, the spring joint elements (14, 14') are attached to the plate/lamella (4) in a base fixture (50) which extends from the top side (52) of the plate/lamella (4) right through the plate/lamella (4) to its bottom side (54) and is fixed there.

Equally on the bottom side (18) of the base plate (12), however, opposite each other in the marginal areas of the two short sides, that is, the front side (20) and the rear side (22), two rollers (24) are positioned in each case which support the front side (20) and the rear side (22) against the plate band (3). At the leading edges of front side (20) and rear side (22) and the longitudinal sides (16,16') as well as on the top side of base plate (12) several shock-absorber springs (28) are provided which support the base plate (12) against a support (frame) construction (30) for the advertising medium(8).

This support (frame) construction (30) includes a bearing surface (32) which exceeds the base plate (12) in length and width, as well as of a front wall (34), a rear wall (36) and two side walls (38, 38') which at their upper side (40) and their lower side (42) are jutting out beyond the bearing surface (32) like a frame.

At the wall sections jutting out beyond the upper side (40), boreholes with fastening screws (44) are provided by which the advertising medium (8) can be fastened to or, respectively, inside this support (frame) construction (30) in a such manner that it cannot be removed.

In the embodiment displayed here, the support (frame) construction (30), in addition, is provided with a rubber lip (48) at its rear wall (36) and its front wall (34), in each case at the lower edge are facing the plate band (2) which serves as injury protection while the system is in operation.

The spring (28) and the spring joint elements (14,14') arranged in a way like or similar to that of the present embodiment represent a buffer or crusher zone which protects both the holding device (6) and the advertising medium (8) attached to it or contained therein as well as the plate (s)/lamella(s) (4) carrying the holding device (6) from the blows and percussive effects such as may occur when items of luggage are thrown onto the steady-flow conveyor.

It goes without saying that this embodiment of the invention constitutes only one example and that the invented steady-flow conveyor and, in particular, the invented holding device attached to it may also have a different detail construction.

In accordance with other and/or further embodiments of the present invention, the advertizing logos/advertising media on the advertising steady-flow conveyors may be turned movable if they are fitted with, for example, a respective hinge joint mechanism.

Moreover, the advertising logos/advertising media may be illuminated, for example, if they are connected to spinning dynamo, by means of a contact loop, or in another manner known in the art.

Figure 5:
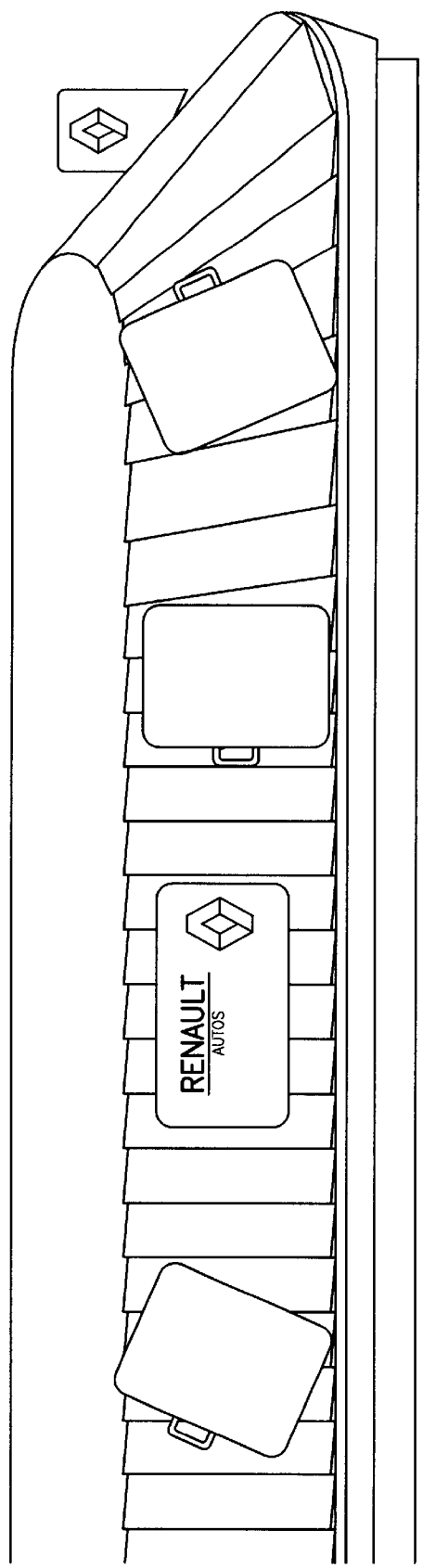
FIG. 5 is a plate conveyor in accordance with a further embodiment of the invention, having a slanted transport face.

In addition, the transport face of the advertising steady-flow conveyors may be arranged in flat or half-slanted way. In this regard, FIG. 5 illustrates an embodiment of the present invention with a slanted transport face.

Moreover, the advertizing logos/advertizing media may include, or have associated therewith, a speech transmission component which allows the advertizing logos/advertizing media to "speak."

Finally, according to the size of the advertising logo/advertising medium, its holding device may be fixed at one or more transport plates/transport lamellas/load carrier elements. The fixation at more than one transport plates/transport lamellas/load carrier elements is preferably performed by the help of the joint adapter.

What is claimed is:

1. A steady-flow conveyor with continuous load carrier having a top load-bearing plane for the transport of objects and/or persons, said conveyor including a holding device secured to the load carrier, said holding device being configured to hold an advertising medium so that the advertising medium extends into a space over or above the load-bearing plane of the load carrier.

2. The conveyor according to claim 1, wherein the load carrier includes a plurality of longitudinal sections, and wherein the holding device is secured to at least one of said longitudinal sections.

3. The conveyor according to claim 2, wherein the holding device includes a plurality of holding devices, each of said holding devices being secured to at least one of said longitudinal sections.

4. The conveyor according to claim 3, wherein said advertising medium includes a plurality of advertising mediums, each holding device being configured to hold at least one of said advertising mediums.

5. The conveyor according to claim 1, wherein the load carrier is selected from the group consisting of a belt, a band, and a plate band.

6. The conveyor according to claim 1, wherein the holding device is arranged on a top-side of the load carrier.

7. The conveyor according to claim 5, wherein the holding device is arranged on a top-side of the load carrier.

8. The conveyor according to claim 1, wherein the holding device is arranged on at least one of the longitudinal marginal areas of the load carrier.

9. The conveyor according to claim 7, wherein the holding device is arranged on at least one of the longitudinal marginal areas of the load carrier.

10. The conveyor according to claim 1, wherein the holding device comprises a locking or anchoring mechanism which enables free motion at one or more of a plane parallel to, perpendicular to, and at an angle to, a plane of conveyance.

11. The conveyor according to claim 10, wherein the locking or anchoring mechanism is at least one of of a ball-and-socket joint, a walk along joint, and a spring element.

12. The conveyor according to claim 1, wherein the holding device includes safety appliances to prevent unintentional and/or unauthorized opening or removal.

13. A steady-flow conveyor with continuous load carrier for the transport of objects and/or persons said conveyor including a holding device secured to the load carrier, wherein the holding device includes one or more spring elements to form a buffer zone.

14. The conveyor according to claim 13, wherein said spring elements are arranged in at least two planes.

15. The conveyor according to claim 1, further comprising said advertising medium secured to said holding device, wherein said advertising medium is an advertising board.

16. A steady-flow conveyor with continuous load carrier for the transport of objects and/or persons said conveyor including a holding device secured to the load carrier, further comprising an advertising medium secured to said holding device, wherein said advertising medium is configured as the real shape or mock-up of a suitcase, a traveling bag, a knapsack or other customary item of luggage.

17. A steady-flow conveyor with continuous load carrier for the transport of objects and/or persons, said conveyor including a holding device secured to the load carrier, further comprising an advertising medium secured to said holding device, wherein said advertising medium is configured as the real shape or mock-up of the advertised object itself.

18. A steady-flow conveyor with continuous load carrier for the transport of objects and/or persons, said conveyor including a holding device secured to the load carrier, wherein the holding device is configured to hold said advertising medium perpendicularly above a top side of the load carrier.

19. A steady-flow conveyor with continuous load carrier for the transport of objects and/or persons said conveyor including a holding device secured to the load carrier, wherein the holding device is configured to hold said advertising medium above, and at an angle to, a top side of the load carrier.

20. The conveyor according to claim 1, wherein the holding device is configured to hold said advertising medium above, and parallel to, the top side of the load carrier.

* * * * *